;(12) United States Patent
Kobayashi et al.

(10) Patent No.: US 6,856,346 B1
(45) Date of Patent: Feb. 15, 2005

(54) CAMERA OPERATION APPARATUS

(75) Inventors: Taisuke Kobayashi, Tokyo (JP); Kenji Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/289,855

(22) Filed: Apr. 12, 1999

(30) Foreign Application Priority Data

Apr. 17, 1998 (JP) .......................................... 10-107845

(51) Int. Cl.⁷ .......................................... H04N 5/232
(52) U.S. Cl. .......................... 348/211.99; 348/211.11; 348/211.12
(58) Field of Search .......................... 348/14.05, 14.08, 348/14.09, 211.99, 211.1, 211.2, 211.3, 211.4, 211.6, 211.8, 211.11, 211.12, 211.13

(56) References Cited

U.S. PATENT DOCUMENTS

| | | | |
|---|---|---|---|
| 5,745,161 A | * 4/1998 | Ito ........................... 348/14.09 |
| 6,101,536 A | * 8/2000 | Kotani et al. ................ 348/143 |
| 6,122,005 A | * 9/2000 | Sasaki et al. ............. 348/211.3 |
| 6,133,941 A | * 10/2000 | Ono ......................... 348/14.05 |
| 6,137,485 A | * 10/2000 | Kawai et al. ............. 348/14.05 |
| 6,414,716 B1 | * 7/2002 | Kawai ...................... 348/211.3 |
| 6,608,649 B2 | * 8/2003 | Suzuki et al. ............. 348/211.8 |

* cited by examiner

*Primary Examiner*—Ngoc-Yen Vu
*Assistant Examiner*—Luong T Nguyen
(74) *Attorney, Agent, or Firm*—Cowan, Liebowitz & Latman PC

(57) ABSTRACT

It is an object to provide a camera control system which can immediately cope with control of a plurality of kinds of video cameras. At least one module for generating a camera control command corresponding to each kind of camera is stored. Information associated with a kind of camera serving as a control target is recognized. A module for generating the camera control command is selected from at least one module on the basis of the information associated with the recognized kind of camera.

27 Claims, 16 Drawing Sheets

CAMERA OPERATION APPARATUS

BACKGROUND OF THE INVENTION

1. Field of the Invention

The present invention relates to a camera control system capable of remote-controlling a camera via a network.

2. Related Background Art

A video image transmission system has recently been proposed, which transmits a video image from a video camera connected via a network such as the Internet to a plurality of clients (computer terminal stations).

A camera control system capable of controlling the functions such as panning, tilting, and zooming added to the video camera from a camera operation apparatus (client) via a network has also been proposed. A video camera added with new functions in addition to panning, tilting, and zooming or a video camera operating in a control mode different from a conventional one have been developed these days. A plurality of kinds of video cameras are being connected to the present network.

When the video cameras having different control modes are connected to the network, a camera operation apparatus and a camera server must execute control commands respectively corresponding to these different control modes.

SUMMARY OF THE INVENTION

It is an object of the present invention to provide a camera control system flexibly coping with control of the plurality of kinds of video cameras described above.

In order to achieve at least one object described above, according to an aspect of the present invention, there is provided a camera operation apparatus for operating a camera via a network, comprising:

storage means for storing at least one module for generating a control command for the camera in accordance with each kind of camera;

recognition means for recognizing information associated with a kind of camera subject to control;

selection means for selecting a module for generating the control command for the camera from the at least one module, on the basis of the information associated with the kind of camera recognized by the recognition means; and module request means, connected to the network, for requesting through the network, a transmission of the module corresponding to the kind of camera recognized by the recognition means to a device having the module corresponding to the kind of camera recognized by the recognition means, when said camera operation apparatus has no module corresponding to the kind of camera recognized by the recognition means.

According to an another aspect of the present invention, there is provided a camera operation apparatus for operating a camera via a network, comprising:

storage means for storing at least one module for generating a control command for the camera in accordance with each kind of camera;

recognition means for recognizing information associated with a kind of camera subject to control;

selection means for selecting a module for generating the control command for the camera from the at least one module, on the basis of the information associated with the kind of camera recognized by the recognition means; and display means for displaying a window for operating the camera, on the basis of the module selected by the selection means, wherein the display means changes at least display contents for operation in said window in accordance with a kind of camera.

According to a still another aspect of the present invention, there is provided a camera server for controlling a camera on the basis of a control instruction received from a camera operation apparatus via a network, comprising:

determination means for determining whether the camera operation apparatus can control the camera when a camera control right request is received from said camera operation apparatus; and output means for outputting a camera control right obtaining notice to the camera operation apparatus and information associated with the kind of camera together with the notice when the determination means determines that the camera operation apparatus can control the camera.

According to a still another aspect of the present invention, there is provided a camera operation method of operating a camera via a network, comprising the steps of:

storing at least one module for generating a control command for the camera in accordance with each kind of camera;

recognizing information associated with a kind of camera subject to control;

selecting a module for generating the control command for the camera from the at least one module, on the basis of the information associated with the kind of camera recognized in the recognizing step; and requesting through the network, transmission of the module corresponding to the kind of camera recognized in the recognizing step to a device having the module corresponding to the kind of camera recognized in the recognizing step, when there is no module corresponding to the kind of camera recognized in the recognizing step.

According to a still another aspect of the present invention, there is provided a camera operation method of operating a camera via a network, comprising the steps of:

storing at least one module for generating a control command for the camera in accordance with each kind of camera;

recognizing information associated with a kind of camera subject to control;

selecting a module for generating the control command for the camera from the at least one module, on the basis of the information associated with the kind of camera recognized in the recognizing step; and displaying a window for operating the camera, on the basis of the module selected in the selecting step, wherein said displaying step changes at least display contents for operation in said window in accordance with a kind of camera.

According to a still another aspect of the present invention, there is provided a storage medium for storing a computer-readable program for executing a camera operation processing comprising the steps of:

storing at least one module for generating a control command for the camera in accordance with each kind of camera;

recognizing information associated with a kind of camera subject to control;

selecting a module for generating the control command for the camera from the at least one module, on the basis of the information associated with the kind of camera recognized in the recognizing step; and requesting through the network, transmission of the module corresponding to the kind of camera recognized in the recognizing step to a device having the module corresponding to the kind of camera recognized in the recognizing step when there is no module corresponding to the kind of camera recognized in the recognizing step.

According to a still another aspect of the present invention, there is provided a storage medium for storing a computer-readable program for executing a camera operating processing comprising the steps of:

storing at least one module for generating a control command for the camera in accordance with each kind of camera;

recognizing information associated with a kind of camera subject to control;

selecting a module for generating the control command for the camera from the at least one module, on the basis of the information associated with the kind of camera recognized in the recognizing step; and displaying a window for operating the camera, on the basis of the module selected in the selecting step, wherein said displaying step changes at least display contents for operation in said window in accordance with a kind of camera.

According to a still another aspect of the present invention, there is provided a storage medium for storing a computer-readable program for executing a camera control processing comprising the steps of:

determining whether the camera operation apparatus can control the camera when a camera control right request is received from a camera operation apparatus via a network; and outputting a camera control right obtaining notice to the camera operation apparatus and information associated with the kind of camera together with the notice when it is determined in the determining step that the camera operation apparatus can control the camera.

The above and other objects, features, and advantages of the present invention will be apparent from the following detailed description of the preferred embodiments in conjunction with the accompanying drawings.

DESCRIPTION OF THE PREFERRED EMBODIMENTS

The preferred embodiments of the present invention will be described with reference to the accompanying drawings.

Figure 1:
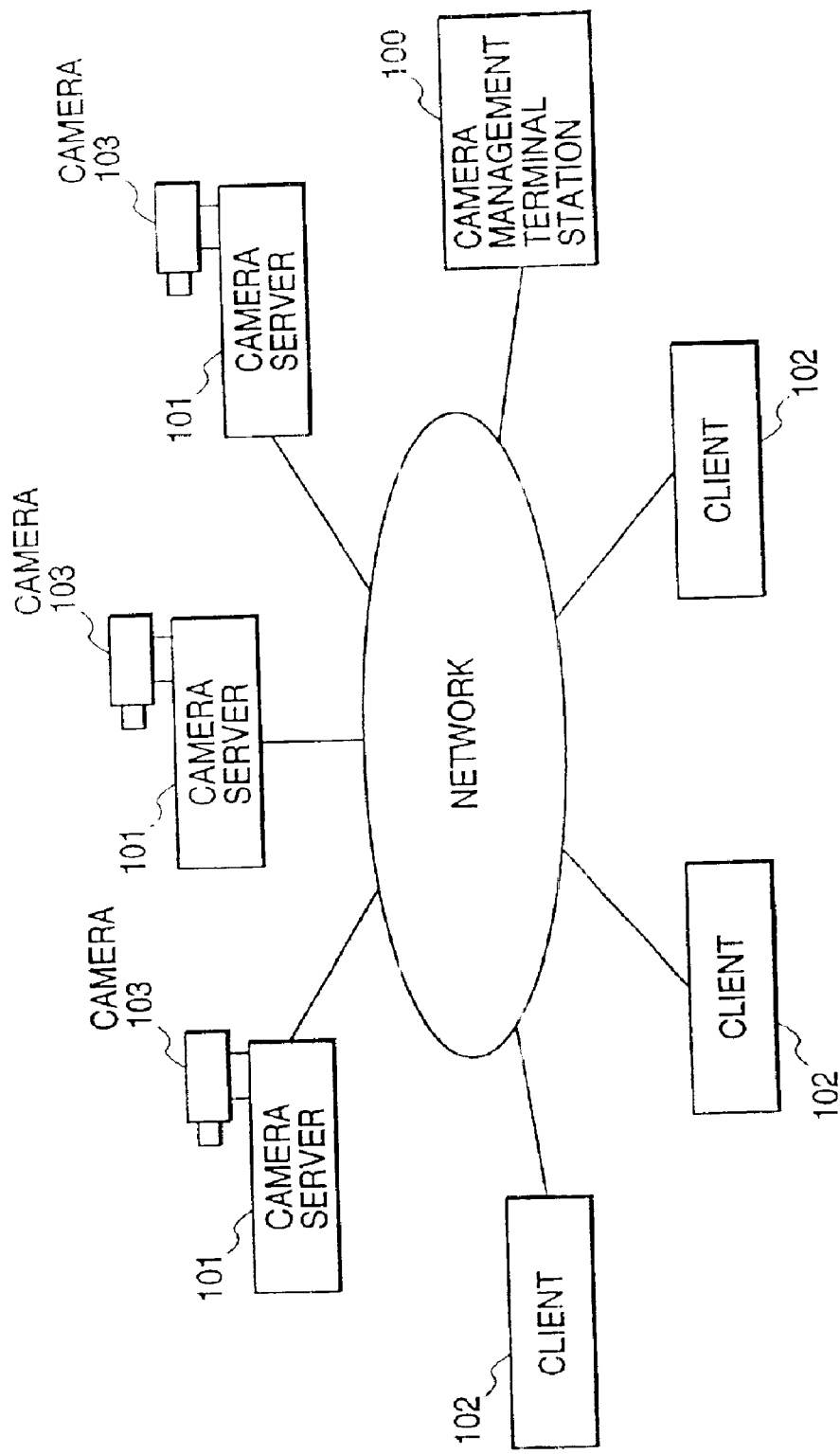
FIG. 1 is a block diagram showing a camera control system according to the first embodiment of the present invention.

FIG. 1 is a block diagram showing a camera control system according to the first embodiment of the present invention. This system comprises camera servers 101, clients 102, and camera devices 103. In each camera device 103, the image sensing direction of panning or tilting can be controlled, and zooming can also be controlled by controlling the pulse count of a zoom lens (not shown).

Each of the camera server 101 and client 102 is made up of an information processing device such as a computer, which is connected to a network such as the Internet or an intranet. In the camera system of this embodiment, a request is sent from each client 102 to each camera server 101 via the network and is accepted, video image data is distributed from this camera server 101 to the corresponding client 102. The video image picked up by the camera device 103 can be observed in this client 102. A camera control command is sent from each client 102 to each camera server 101 to allow zooming, panning, and titling in the corresponding camera device 103. Each client 102 selects a desired one of the plurality of camera servers 102 (in practice, the client selects the camera device connected to the camera server).

A camera management terminal station 100 provides setting information to the respective camera devices connected to the network in start-up of the camera devices. Note that the camera management terminal station 100 may be incorporated in any one of the camera servers 101 or in each camera server 101.

Figure 2:
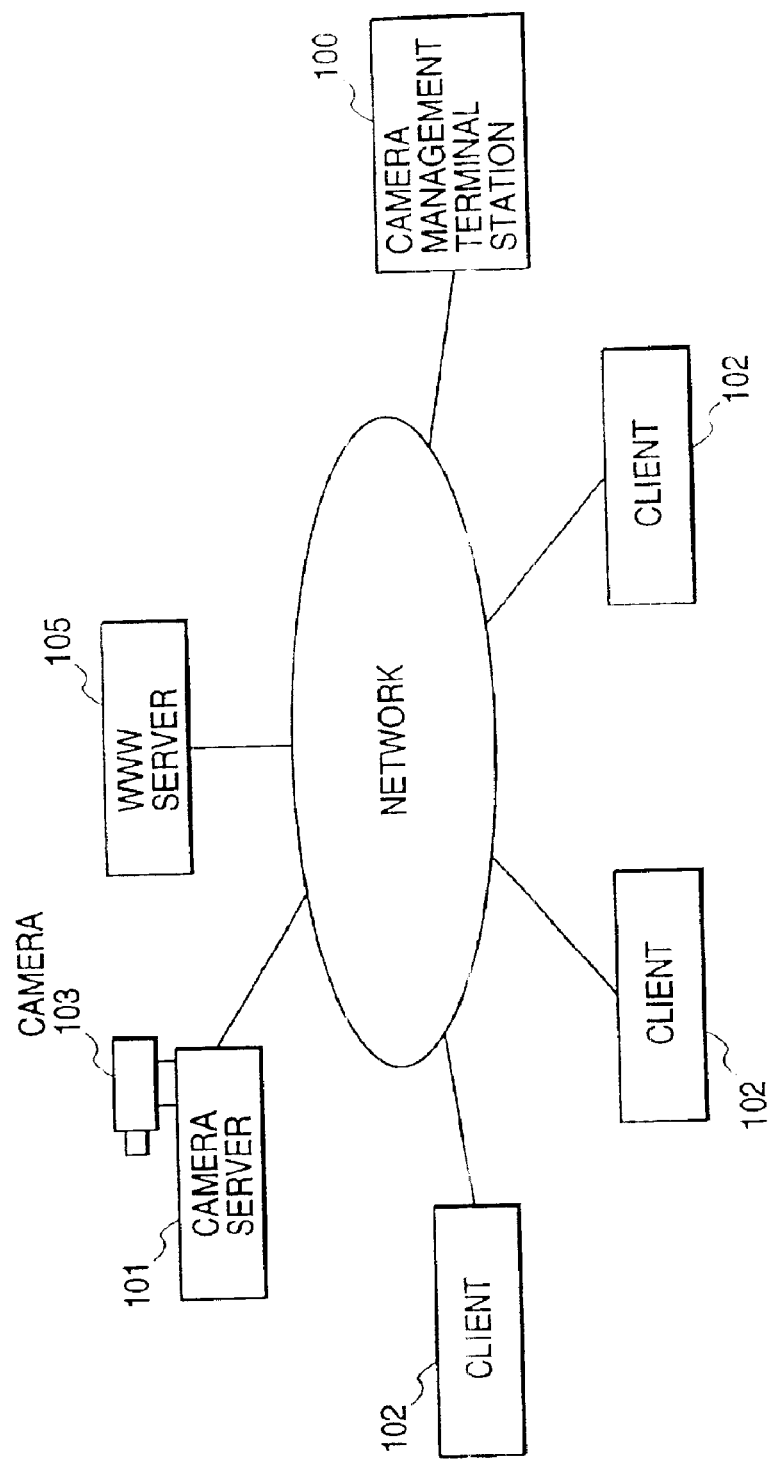
FIG. 2 is a block diagram showing a camera control system as a modification of the embodiment shown in FIG. 1.

FIG. 2 shows a modification of the camera control system shown in FIG. 1. This system incorporates a popular Web technique and must have a WWW (World Wide Web) server 105 connected to the network. Web page data in the WWW server 105 has links representing the correspondence between specific addresses and specific camera servers. The WWW server 105 can be easily connected to a desired camera server.

In the WWW, a server using another protocol is accessed directly or via a gateway and the access result is presented to the user in the form of a hypertext. A WWW browser sends information in accordance with an URL (Uniform Resource Locator) representing the storage destination of subject data to the WWW server serving as the storage destination of documents and image data. In response to this, the WWW server sends back the corresponding document and image data to the WWW browser.

Figure 3:
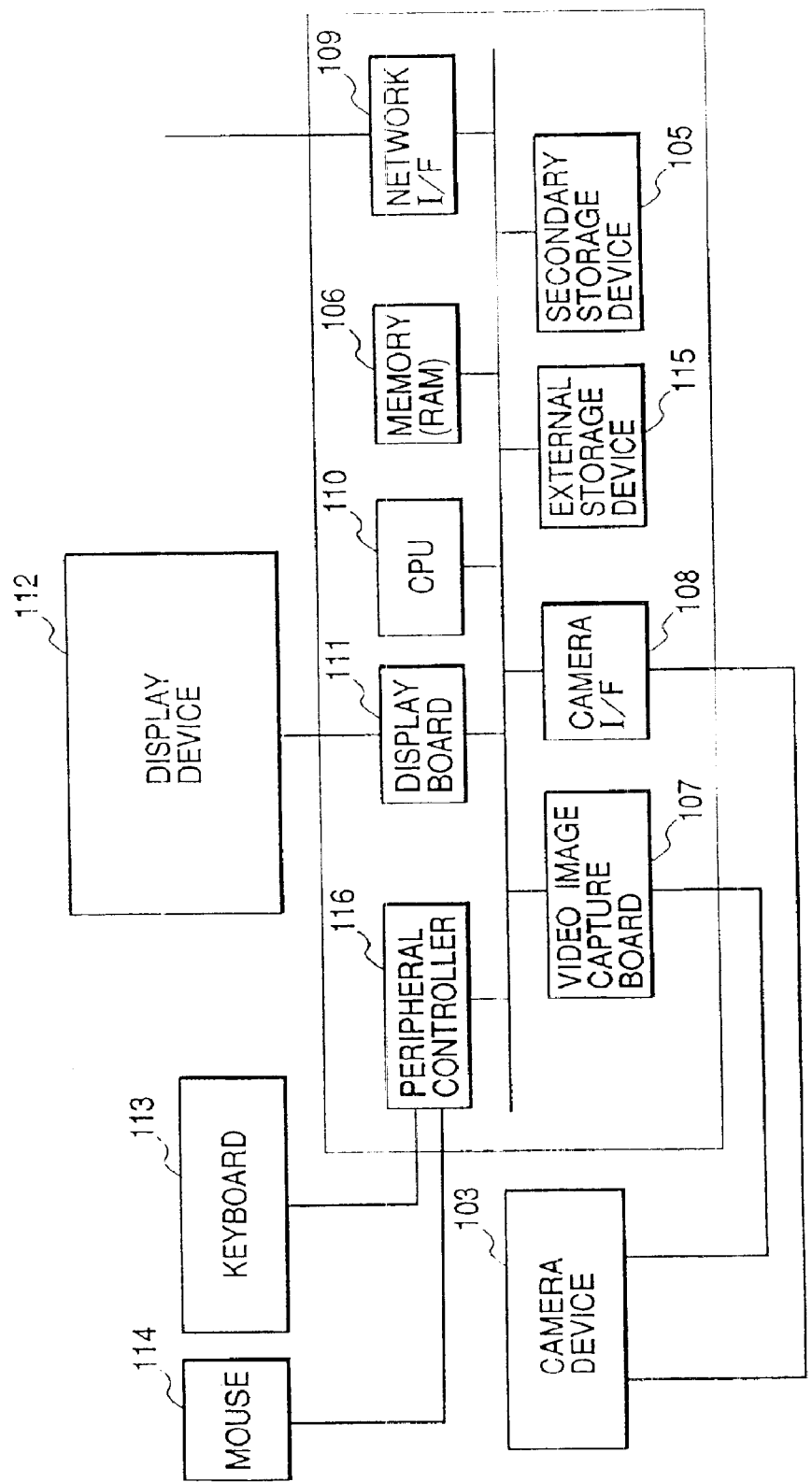
FIG. 3 is a block diagram showing the arrangement of a camera server of this embodiment.

FIG. 3 is a block diagram showing the hardware arrangement of the camera server 101 and camera device 103. As shown in. FIG. 3, this arrangement is comprised of a secondary storage device 105 such as a hard disk or ROM storing predetermined programs, a memory (RAM) 106, a video image capture board 107 for capturing video image data from the camera device 103, a camera I/F 108 for sending a control command to the camera device 103, a network I/F 109 for connecting the network and the camera server, a CPU 110 for executing various processes based on the programs, and an external storage device 115 for loading external programs.

A keyboard 113 and a mouse 114 can input control instructions in controlling the camera device 103 on the camera server 101 side. A peripheral controller 116 receives signals input from the keyboard 113 and mouse 114. An image signal picked up by the camera device 103 is converted into a predetermined signal via a display board 111. A display device 112 displays an image on the basis of the converted signal.

Figure 4:
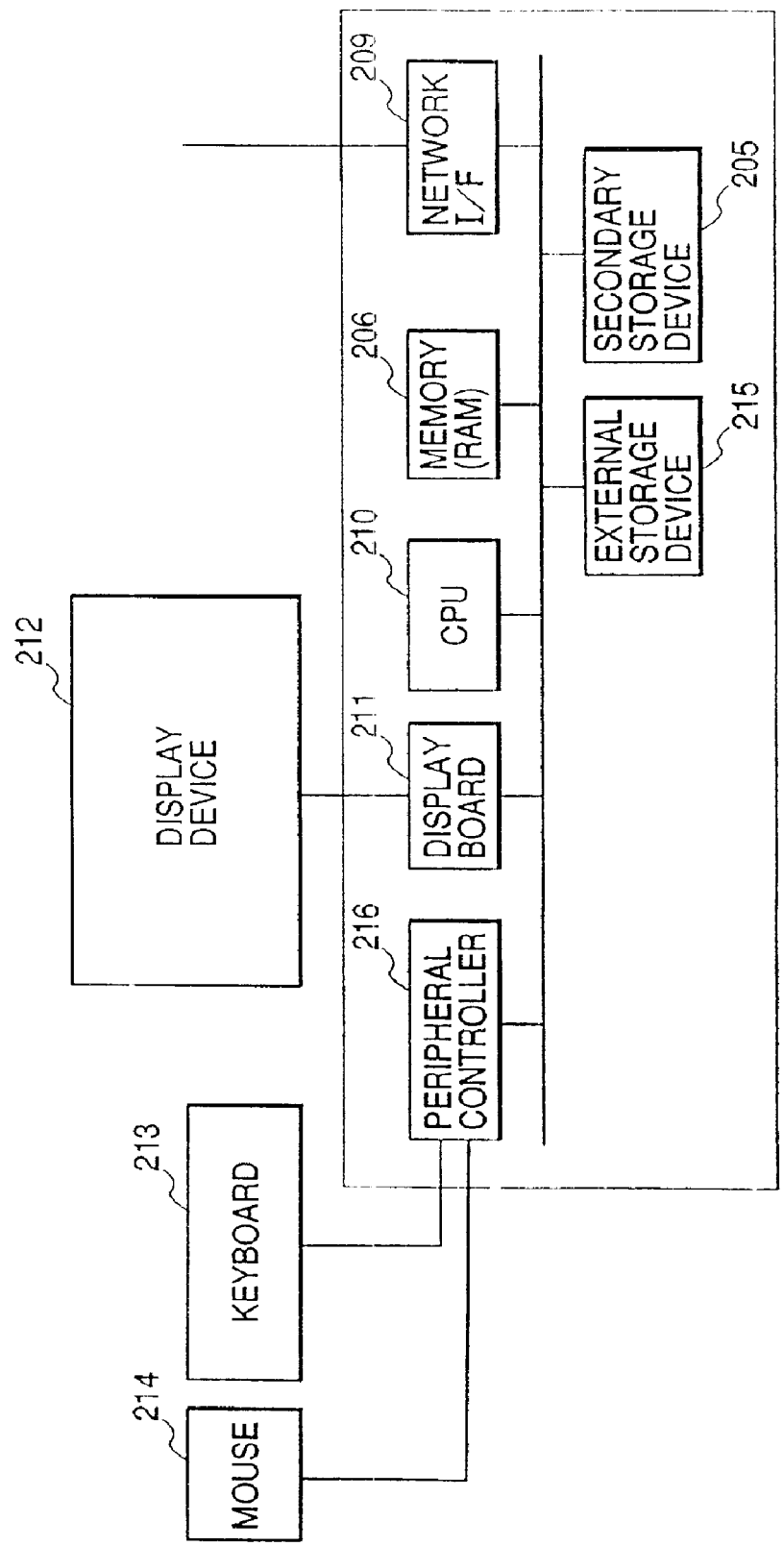
FIG. 4 is a block diagram showing the arrangement of a client of this embodiment.

FIG. 4 shows a hardware arrangement of the client 102. The client 102 is comprised of a secondary storage device 205 such as a hard disk or ROM storing programs, a memory (RAM) 206, a network I/F 209 for connection to the network, a CPU 210 for executing various processes based on programs, an external storage device 215 for loading external programs, a mouse 214 and keyboard 213 for inputting control instructions for the camera device 103 connected to the network via the camera server 101, a peripheral controller 216 for receiving input signals from the mouser 214 and keyboard 213, a display device 212 for displaying an image picked up by the camera device, and a display board 211 for converting a signal sent from the camera server into a predetermined signal in order to display the image on the display device 212.

Figure 5:
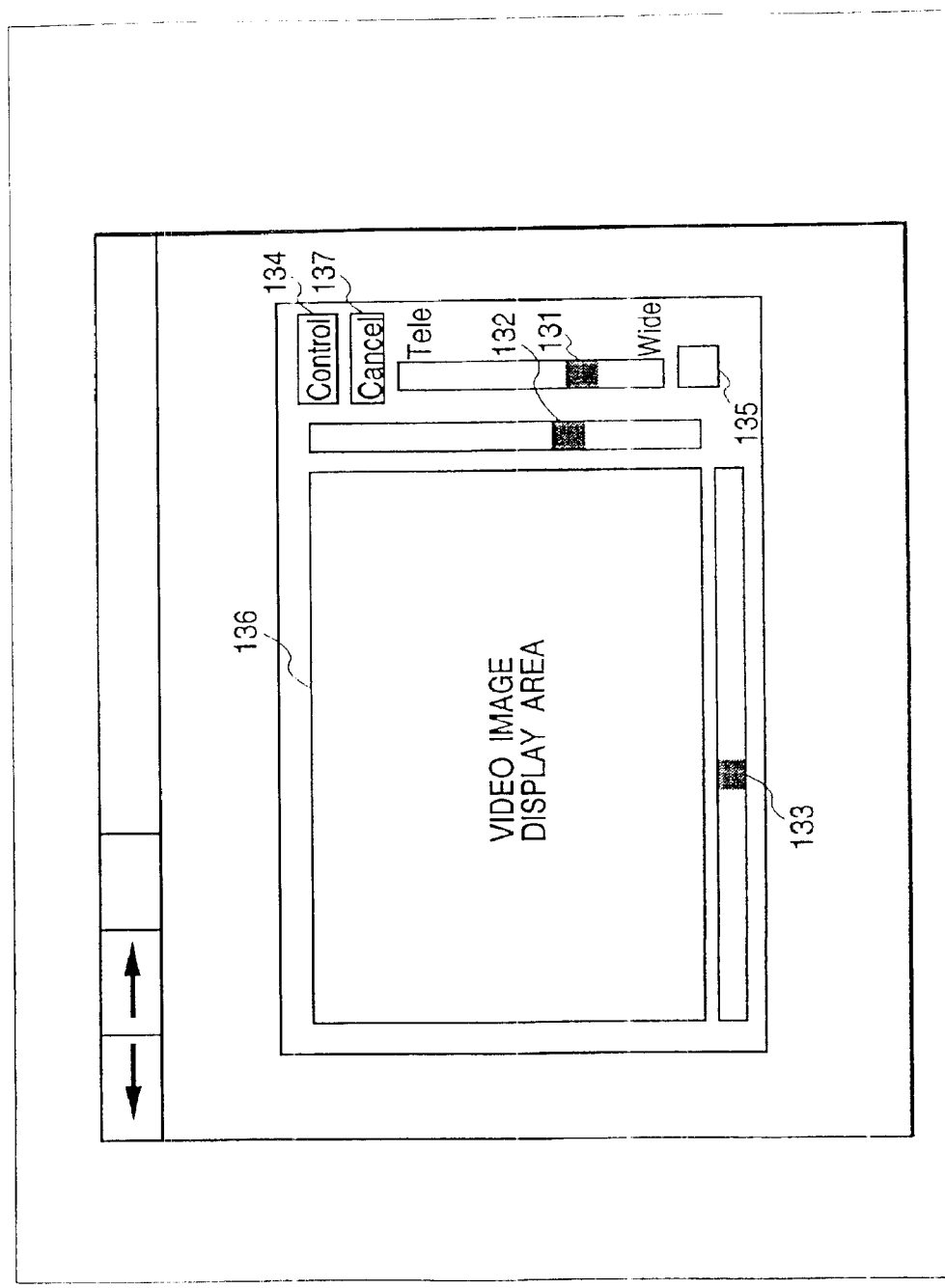
FIG. 5 is a view showing a display window of a display device 212.

FIG. 5 shows the window displayed on the display device 212 of the client 102 of this embodiment. A video image display area 136 displays an image picked up by the camera device 103. A bar 131 controls zooming in the camera device 103. The bar 131 is moved upward with the mouse 214 to control zooming toward the telephoto side. The bar 131 is moved downward with the mouse 214 to control zooming toward the wide-angle side.

A bar 132 controls a tilt direction in image sensing with the camera device 103. When the bar 132 is moved vertically with the mouse 214, the image sensing direction of the camera device 103 can change vertically accordingly.

A bar 133 controls the pan direction in image picked up by the camera device 103. When the bar 133 is dragged horizontally with the mouse 214, the orienting direction of the camera device 103 can change horizontally accordingly. A button 134 is used to request the control right for the camera device 103 to the camera server 101. When this button 134 is clicked, the list of the camera devices 103 connected to the network is displayed. The user can select a desired camera device from the list and can designate the control right for the selected camera. The window also includes a back light correction button 135, and a cancel button 137 serving as an end button for ending control of the camera device 103 under control.

The window in FIG. 5 is a GUI (Graphical User Interface) for inputting camera control instructions, as described above. An image is displayed on the video image display area 136 on the basis of the video image data obtained from the camera server 101. Operation instructions from the bars 131 to 133 and operation buttons are sent to the camera server 101.

Figure 6:
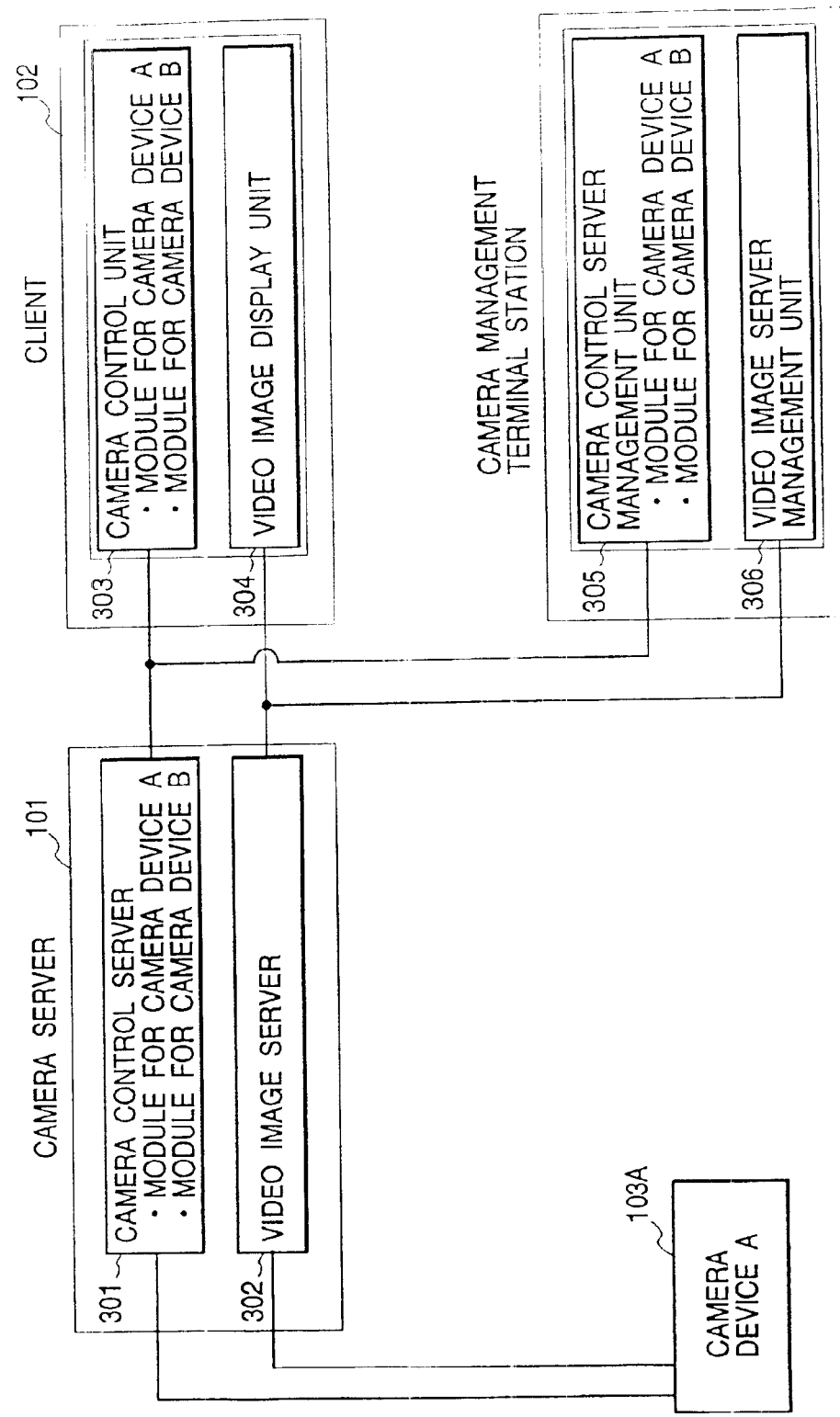
FIG. 6 is a view showing software of the camera control system of this embodiment.

FIG. 6 shows the software of the camera control system of the embodiment described above.

Referring to FIG. 6, a camera control server 301 of the camera server 101 can control a camera device 103A or a camera device 103B different from the kind of the camera device 103A in accordance with a control instruction transmitted from the client 102 via the network. The camera control server 301 operates using a module corresponding to the kind (function) of the camera device 103A or 103B. A video image server 302 processes a video signal output from the camera device 103 connected to it. More specifically, the video image server 302 converts an analog video signal such as an NTSC signal output from the camera device 103 into an RGB or YUV image signal. The video image server 302 also compresses the RGB or YUV image signal into compressed data in accordance with an existing compression scheme such as MPEG or Motion-JPEG. No specific limitation is imposed on the compression means. H.261 or H.263 can also be used. In FIG. 6, the camera device 103A is connected to the camera server 101 for the illustrative convenience.

The client 102 is comprised of a camera control unit 303 for executing a control command of a desired camera device connected to the network, and a video image display unit 304 for displaying a video image on the display screen of the display device 212 by performing expansion and the like of the video image data received from the network. The camera control unit 303 has modules respectively corresponding to the camera devices 103 connected to the network, selects a module necessary for the target camera device, and executes a control command generation process corresponding to the target camera device using the selected module.

In FIG. 6, one camera management terminal station 100, one camera server 101, and one client 102 are connected on the network for the illustrative convenience. However, a plurality of camera management terminal stations 100, a plurality of camera servers 101, and a plurality of clients 102 may be also connected on the network.

A camera control server management unit 305 and a video image server management unit 306 in the camera management terminal station 100 store setting information (to be described later) of the camera devices 103 in the network for each kind of camera device.

Figure 7:
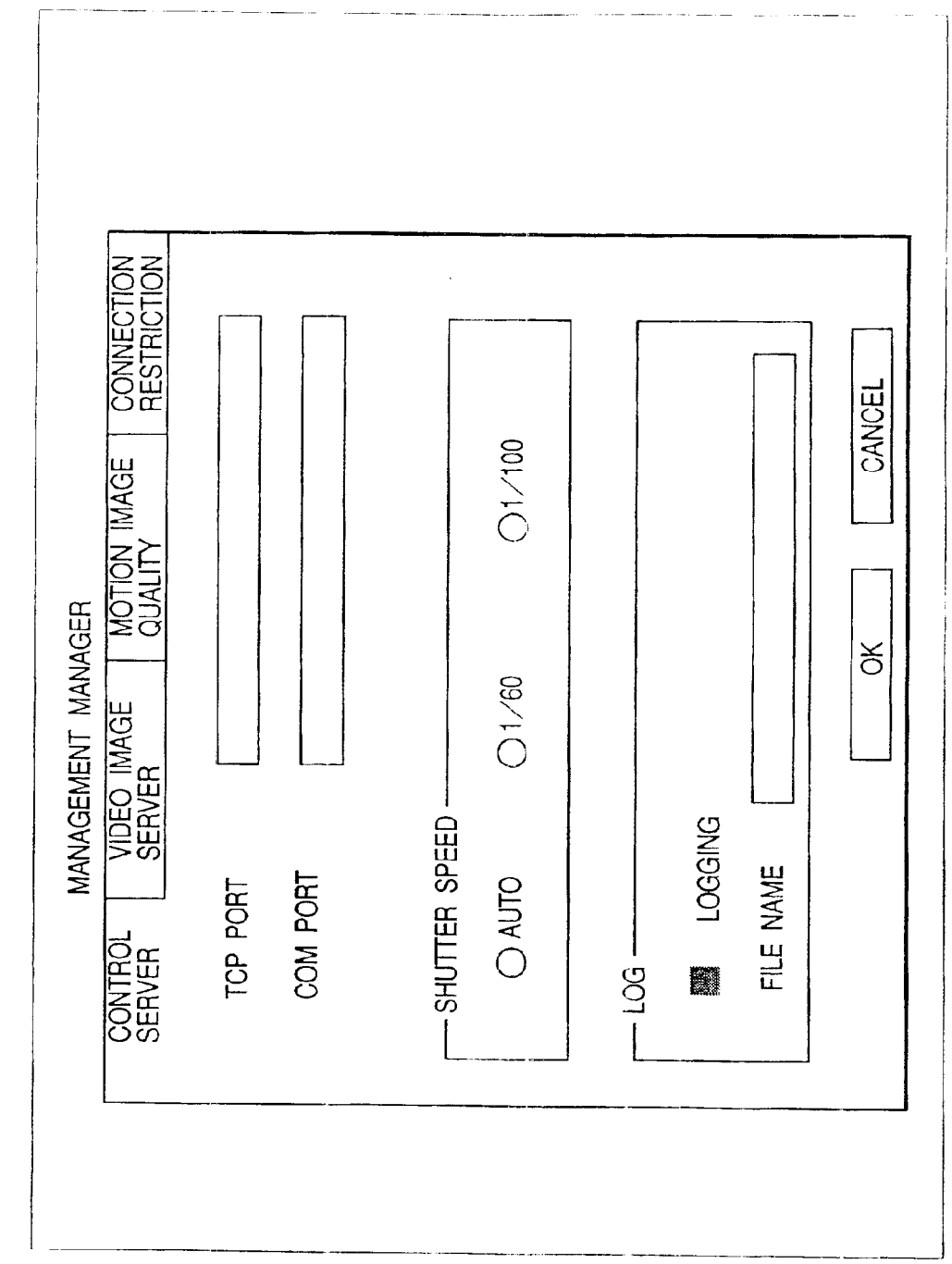
FIG. 7 is a display window for setting camera parameters for a camera server 101 at a camera management terminal station 100.
Figure 8:
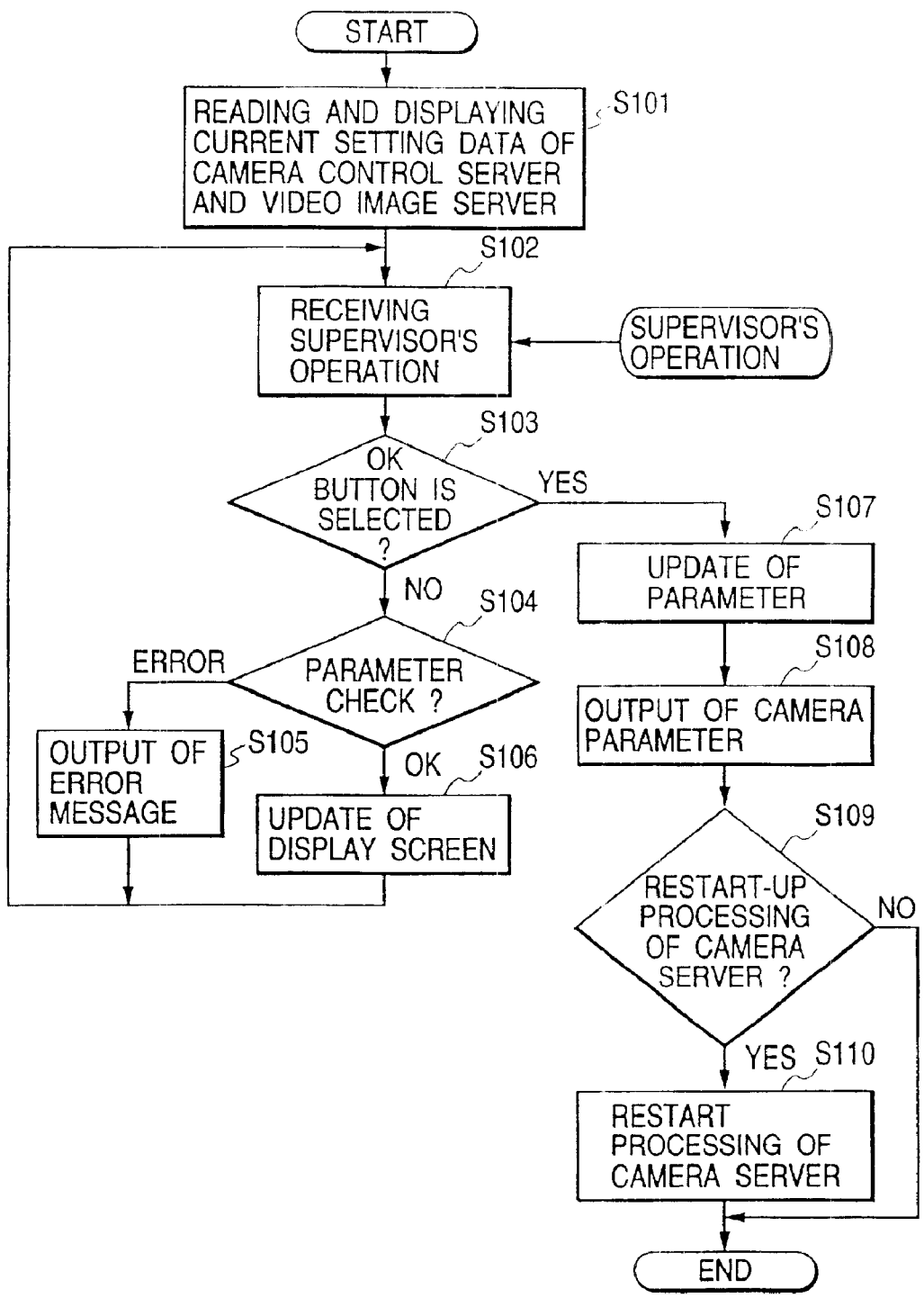
FIG. 8 is a flow chart showing an operation sequence of the camera management terminal station 100 of this embodiment.

FIG. 7 is a display window of the camera management terminal station 100 to set camera parameters used in the camera control server 301 in a specific file (system database such as a registry depending on an OS). FIG. 8 is a flow chart for setting the camera parameters of the camera server 101 in the network on the camera management terminal station 100.

In step S101 of FIG. 8, when the camera management terminal station 100 is started up, the setting information of camera parameters associated with the current camera control server 301 and video image server 302 is read out from a specific file (e.g., the registry file of the OS) on a machine operating the camera control server 301 and video image server 302 via the network. The readout setting information is displayed on the display window, as shown in FIG. 7. Setting modules (Dynamic Link Libraries depending on an OS) are prepared for each kind of camera device. When the camera server 101 is newly started up, the kind of camera device connected to the network is specified to link the camera parameters of the started camera device.

In step S102, when the system supervisor inputs a camera parameter on the window in FIG. 7, the flow advances to step S103. If the supervisor's operation is not selection of the OK button, the flow advances to step S104 to check if the input camera parameter is proper. If NO in step S104, the flow advances to step S105 to output an error message. If YES in step S104, the flow advances to step S106 to update the display screen.

When it is determined in step S103 that the supervisor selected the OK button in step S102, the flow advances to step S107 to update the data (camera parameter) in the memory of the camera management terminal station 100. The flow advances to step S108, and the camera management terminal station 100 outputs the camera parameter corresponding to the connection destination camera server 101 to the specific file on the machine in which the camera control server 301 and the video image server 302 are currently operating via the network. More specifically, the camera management terminal station 100 inquires the kind of camera device (the camera device A in FIG. 6) to which the camera server 101 is currently connected. The camera management terminal station 100 then selects and outputs the camera parameter corresponding to the module with which the camera control server 301 is currently operating.

The flow then advances to step S109 to determine in the camera management terminal station 100 whether the camera server 101 is restarted up to reflect the output camera parameter. If YES in step S109, the flow advances to step S110 to perform restart-up processing of the camera server 101. If NO in step S109, the processing is directly ended.

The camera parameters which can be set in the camera management terminal station in this embodiment are a camera control communication TCP port number, a serial port number of the serial port connected to the camera device 103, a shutter speed, the presence/absence of camera control-associated log information and a log file name, a frame rate which defines a video image capture time interval, compression quality of a video image signal, a maximum time for which one client can control the camera device 103, and the like.

Figure 9:
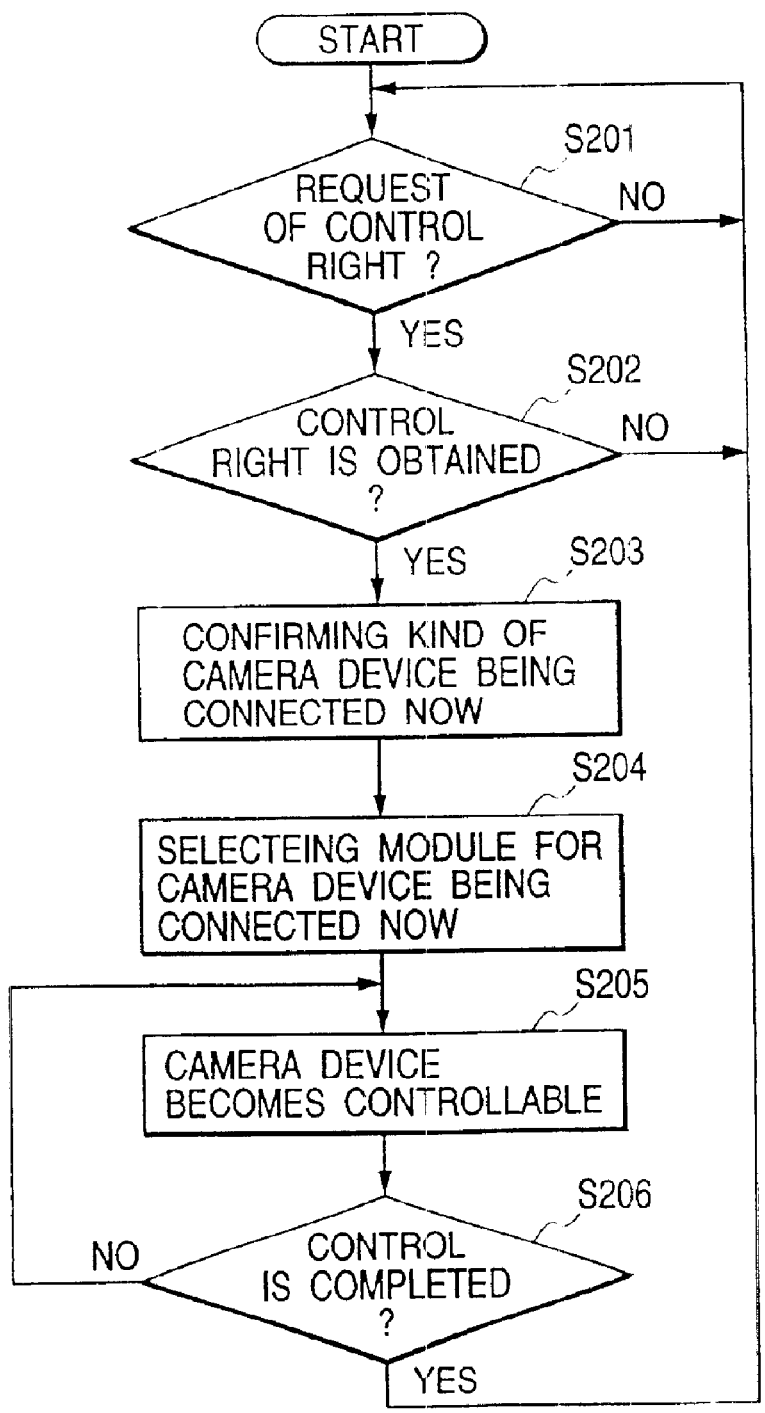
FIG. 9 is a flow chart showing an operation sequence of a client 102 of this embodiment.

FIG. 9 is a flow chart showing an operation sequence on the client 102 side of this embodiment.

It is determined in step S201 whether the control right for the camera device 103 is requested to the camera server 101. If a control right obtaining request is performed on the window in FIG. 5, the flow advances to step S202, and the client 102 waits until a notice representing whether the control right for the camera device 103 is obtained is sent from the camera server 101. If it is confirmed by the transmitted notice that the control right for the camera device 103 cannot be obtained, the flow returns to step S201; otherwise, the flow advances to step S203.

In step S203, the client 102 confirms the kind (function) of the camera device 103 currently connected to the camera server 101 on the basis of data associated with the kind of the camera device 103 currently connected to the camera server 101, which data is contained in the control right obtaining notice data transmitted from the camera server 101.

The flow advances to step S204, and the camera control unit 303 selects a module corresponding to the kind (function) of the confirmed camera device 103. Since the camera device connected to the camera server 101 is the camera device 103A in FIG. 6, the module for the camera device 103A is selected, and the flow advances to step S205. The operation of the camera control unit 303 is started on the basis of the selected module to allow control of the camera device 103A.

In step S206, the control time for the camera device 103A becomes almost the time limit or the client 102 releases the camera control right, control of the camera device 103A is completed.

As described above, according to this embodiment, the module for operating the camera control unit 303 is automatically switched depending on the kinds of camera devices to be controlled. The user need not search for the module of the camera control unit 303 corresponding to the kind of currently connected camera device.

The second embodiment of the present invention will exemplify a camera control system in which a new kind of camera is connected to a camera server 101.

Figure 10:
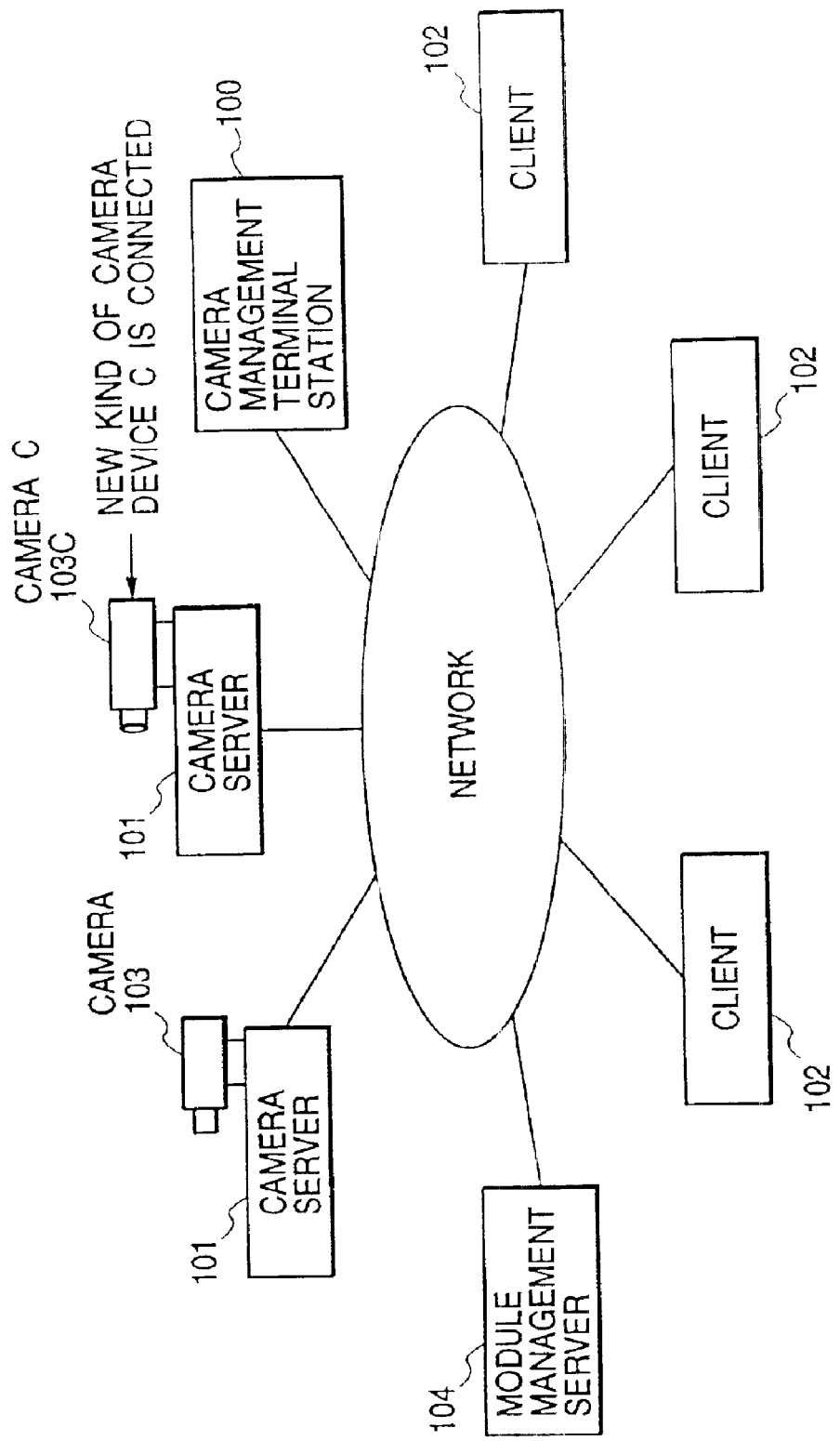
FIG. 10 is a block diagram showing a camera control system according to the second embodiment of the present invention.

FIG. 10 is a block diagram of the camera control system according to the second embodiment. As shown in FIG. 10, a module management server 104 is connected on the network. This module management server 104 has a plurality of modules respectively corresponding to all kinds (functions) of camera devices 103. The plurality of modules are selectively distributed to the camera server 101, a client 102, and a camera management terminal station 100. The plurality of modules in the module management server 104 can cope with functional differences in control command formats of the different camera devices 103, image sensing direction control ranges of the camera devices 103 or presence/absence of control, drive limit of zoom magnification, presence/absence of driving, or presence/absence of the back light correction function, and the like. The module management server 104 may define the distributable management range of its modules on the network. In this case, a plurality of module management servers 104 are connected on the network and distribute the modules to the camera servers 101, clients 102, camera management terminal stations 100, and the like located within the management ranges of these servers 104.

The arrangement of the camera server 101, client 102, and the camera management terminal station 100 of the second embodiment is substantially the same as that of the first embodiment, and a detailed description thereof will be omitted.

Figure 11:
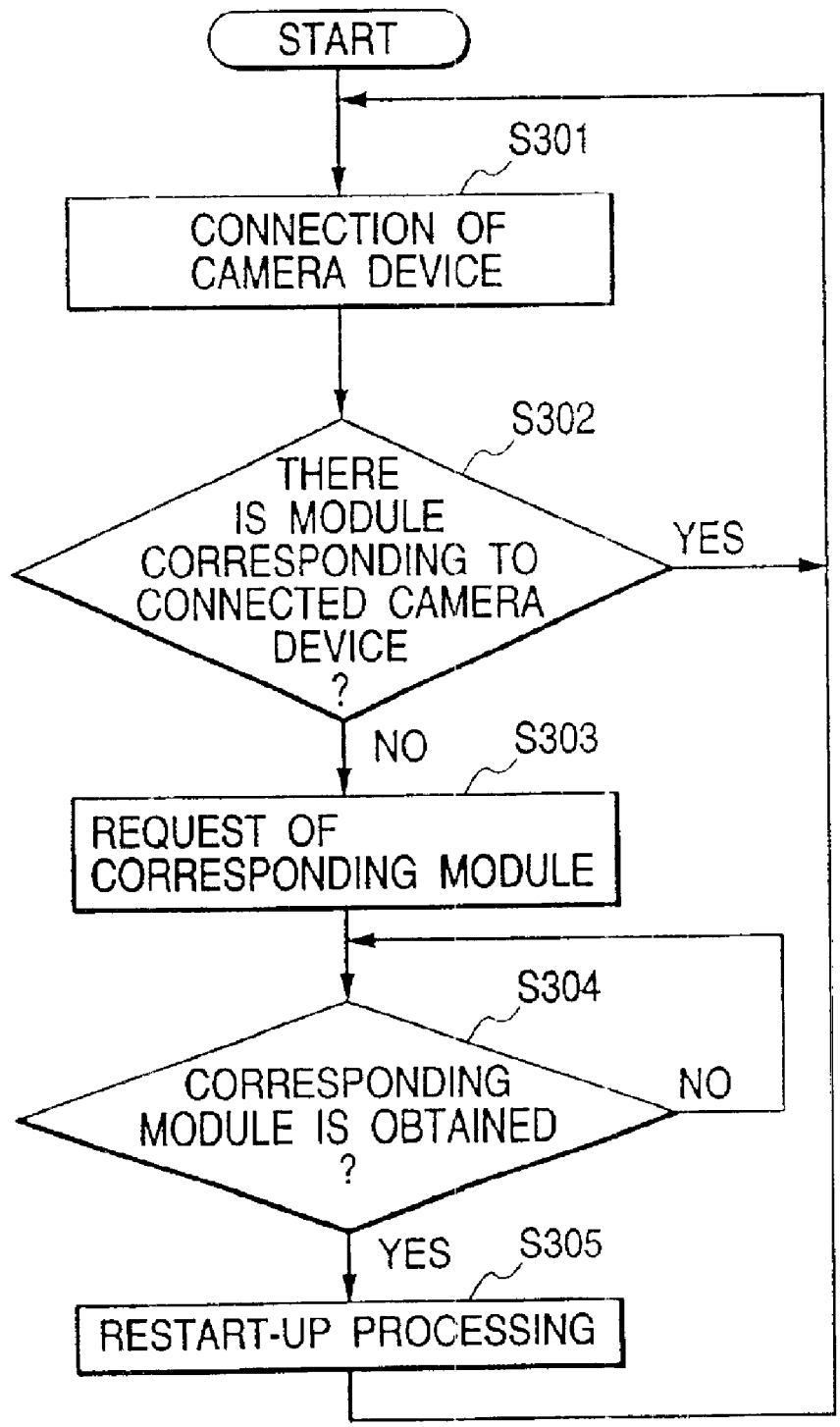
FIG. 11 is a flow chart showing an operation sequence of a camera server 101 of the embodiment shown in FIG. 10.

FIG. 11 is a flow chart showing an operation sequence of the camera server 101 when the camera device 103 is newly connected to the camera server 101. The second embodiment will be described with reference to FIG. 11.

In step S301, when the camera device 103 is newly connected to the camera server 101 (the camera 103C in FIG. 10), the flow advances to step S302 to determine whether there is a module corresponding to the connected camera device 103. In this case, the following determination methods can be used. The modules in a camera control server 301 in the camera server 101 are operated individually, and whether there is the module corresponding to the connected camera device is determined based on the return results from the connected camera device 103. Alternatively, the supervisor inputs information associated with the kind (function) of the connected camera device 103 in the camera server, and whether there is the module corresponding to the connected camera device is determined on the basis of the input result. According to a still alternative method, the modules of the module management server 104 are operated individually, and the kind of the connected camera 103 is determined on the module management server 104 side.

When it is determined that there is the module corresponding to the currently connected camera device 103 in the camera control server 301, the flow returns to step S301.

The camera control server 301 is kept operated until the current module outputs a change in correction of the new camera device 103.

If NO in step S302, the flow advances to step S303 to request a module corresponding to the currently connected camera device 103 (the camera device 103C in FIG. 10) to the module management server 104.

In step S304, when the requested module is received from the module management server 104, the flow advances to step S305 to perform restart-up processing in the camera server 101. The camera control server 301 can be operated by the module (the module corresponding to the camera 103C in FIG. 10) corresponding to the currently connected camera device 103. In step S304, the module management server 104 also outputs the module corresponding to the camera device 103C to the camera management terminal station 100. This allows operating the camera management terminal station 100 in correspondence with the camera device 103C.

As described above, according to the second embodiment, even if the camera server 101 does not have a module corresponding to the newly connected camera device, the camera server 101 can obtain the corresponding module from the module management server 104 connected on the network. Therefore, when the new kind of camera device 103 is connected, this camera device can be immediately and easily operated.

The third embodiment of the present invention allows a client 102 to control a camera device 103 in the camera control system of the second embodiment. The arrangement of a camera server 101, the client 102, and a camera management terminal station 100 is substantially the same as that of the first and second embodiments, and a detailed description thereof will be omitted.

Figure 12:
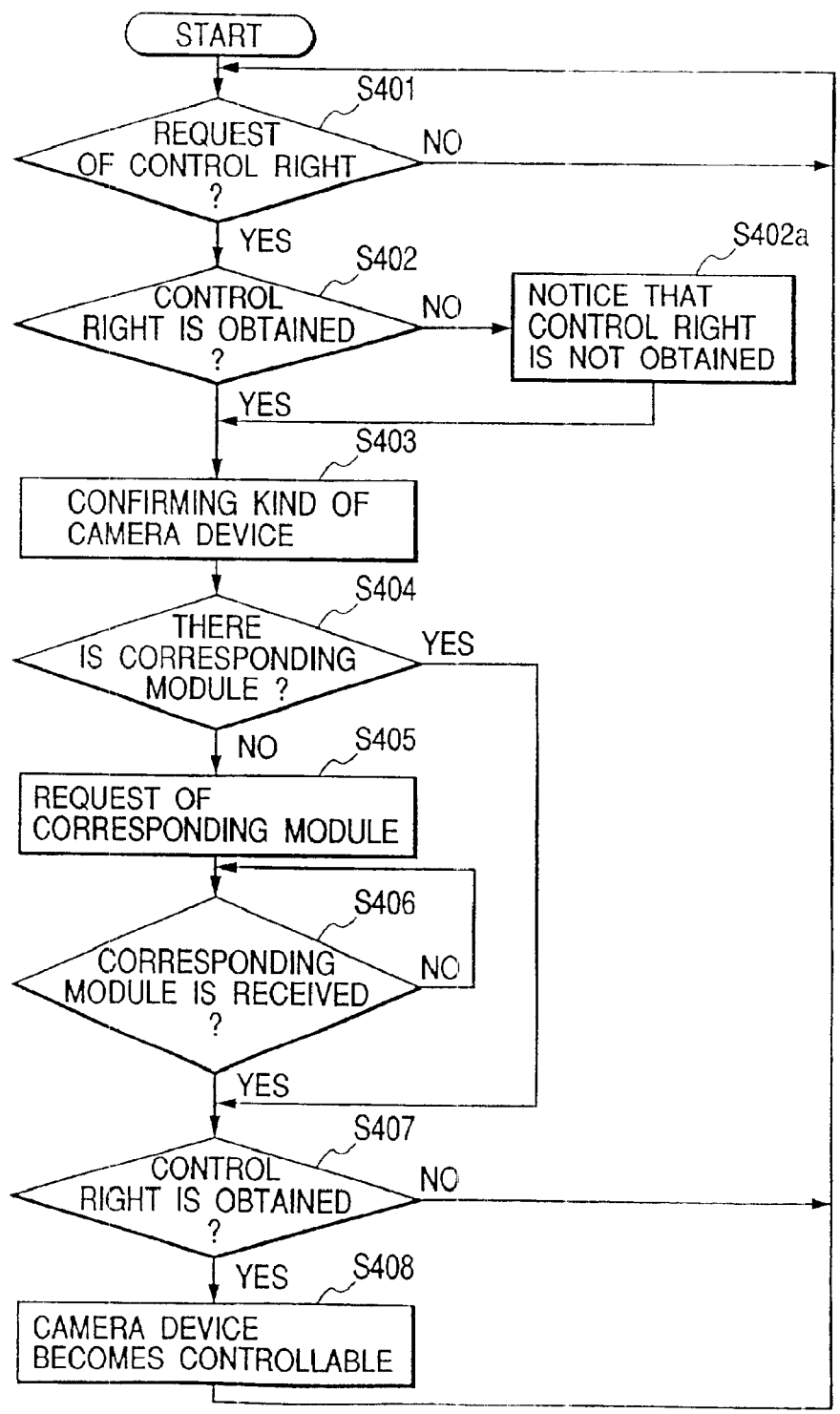
FIG. 12 is a flow chart showing an operation sequence of a client 102 according to the third embodiment of the present invention.

FIG. 12 is a flow chart showing an operation sequence of the client 102 when the client 102 requests a control right for an arbitrary camera device. The third embodiment will be described with reference to FIG. 12.

The client 102 determines in step S401 whether the control right for the camera device 103 is requested to the camera server 101. When the request for obtaining the control right is made on the window in FIG. 5, the flow advances to step S402, and the client 102 waits until a notice representing whether the control right for the camera device 103 is obtained is transmitted from the camera server 101. If no control right for the camera device 103 is obtained, the flow advances to step S402a. The client 102 receives from the camera server 101 a notice representing that the control for the camera server 103 is not obtained.

In step S403, the client 102 confirms the kind (function) of the camera device 103 connected to the target camera server 101 on the basis of the control right obtaining notice transmitted from the camera server 101 or data associated with the kind of camera device 103 currently connected to the camera server 101, which data is transmitted together with notice data representing that the control right cannot be obtained. In this case, the information received by the client contains information associated with the control command of the camera device 103 and the presence/absence of the function of the camera device 103.

The flow then advances to step S404. When the module (for the camera device 103C in FIG. 10) corresponding to the kind (function) of the target camera device 103 cannot be confirmed, the flow advances to step S405 to request the module management server 104 to transmit the corresponding module. When the client 102 receives the module corresponding to the target camera device 103 from the module management server 104, the flow advances to step S407. If the control right for the target camera device 103 is obtained, the flow advances to step S408 to allow control of the camera device 103; otherwise, the flow returns to step S401.

The client 102 confirms that the module (for the camera device 103C in FIG. 10) corresponding to the kind (function) of the target camera device 103 is stored in a camera control unit 303, the flow advances to step S407. When the control right is obtained, the currently connected camera device 103 can be controlled.

In step S408, when a cancel button 137 is pressed, or the control time for the currently connected camera device 103 reaches the time limit, control of the camera device 103 is completed.

As described above, according to this embodiment, even if the client 102 does not have the module corresponding to the target camera device 103 in camera control, the client 102 can receive the module corresponding to the target camera device 103 from the module management server 104 via the network, thereby allowing the client 102 to immediately control the camera device 103.

Figure 13:
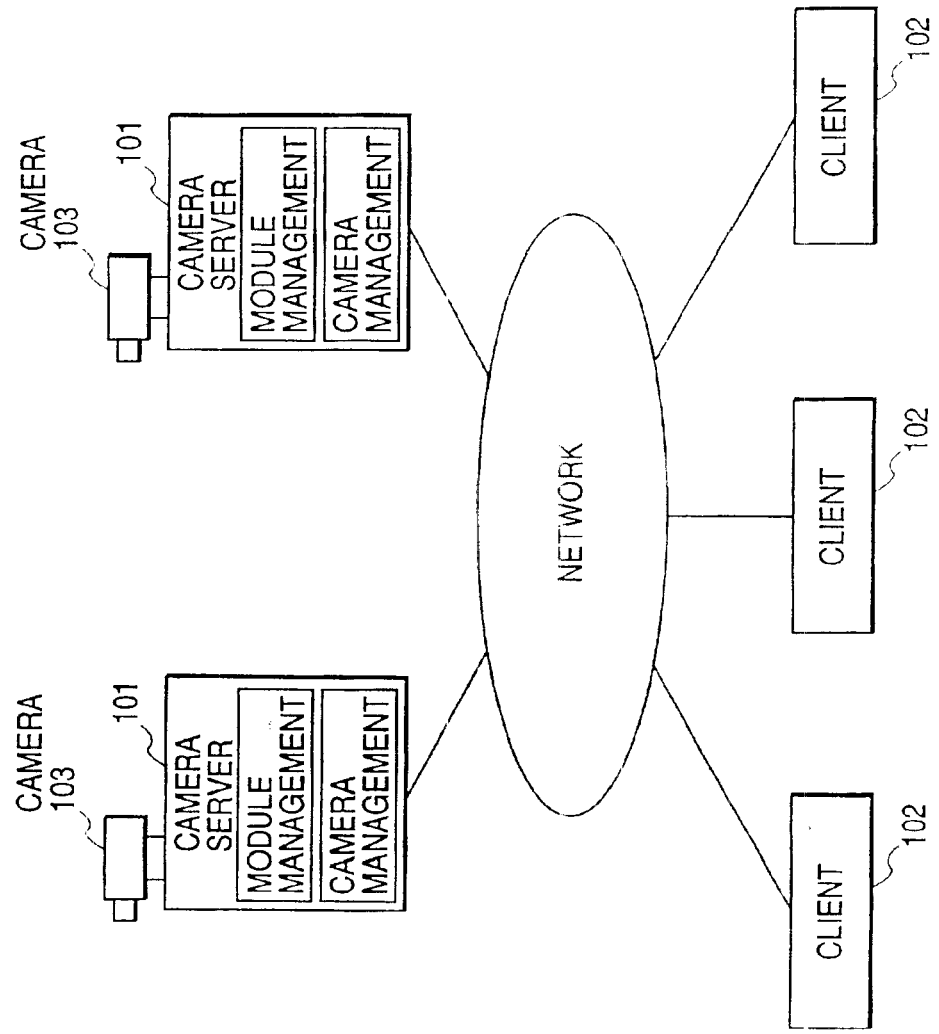
FIG. 13 is a block diagram showing a modification of the embodiment shown in FIG. 12.

In the above embodiment, the camera server 101, the module management server 104, and the camera management terminal station 100 are independently connected to the network. However, as shown in FIG. 13, each camera server 101 may have the functions of the module management server 104 and camera management terminal station 100. In this case, processes between the camera server 101, module management server 104, and camera management terminal station 100, which have been performed via the network, are executed in the camera server 100. The client 102 requests the camera server 101 connected to the currently connected camera device 103 to transmit the module corresponding to the currently connected camera device 103.

In the first and third embodiments, when the module corresponding to the kind of camera device 103 is selected on the client 102 side, the display mode of the operation buttons in the window displayed on the display device 212 shown in FIG. 5 changes.

Figure 14:
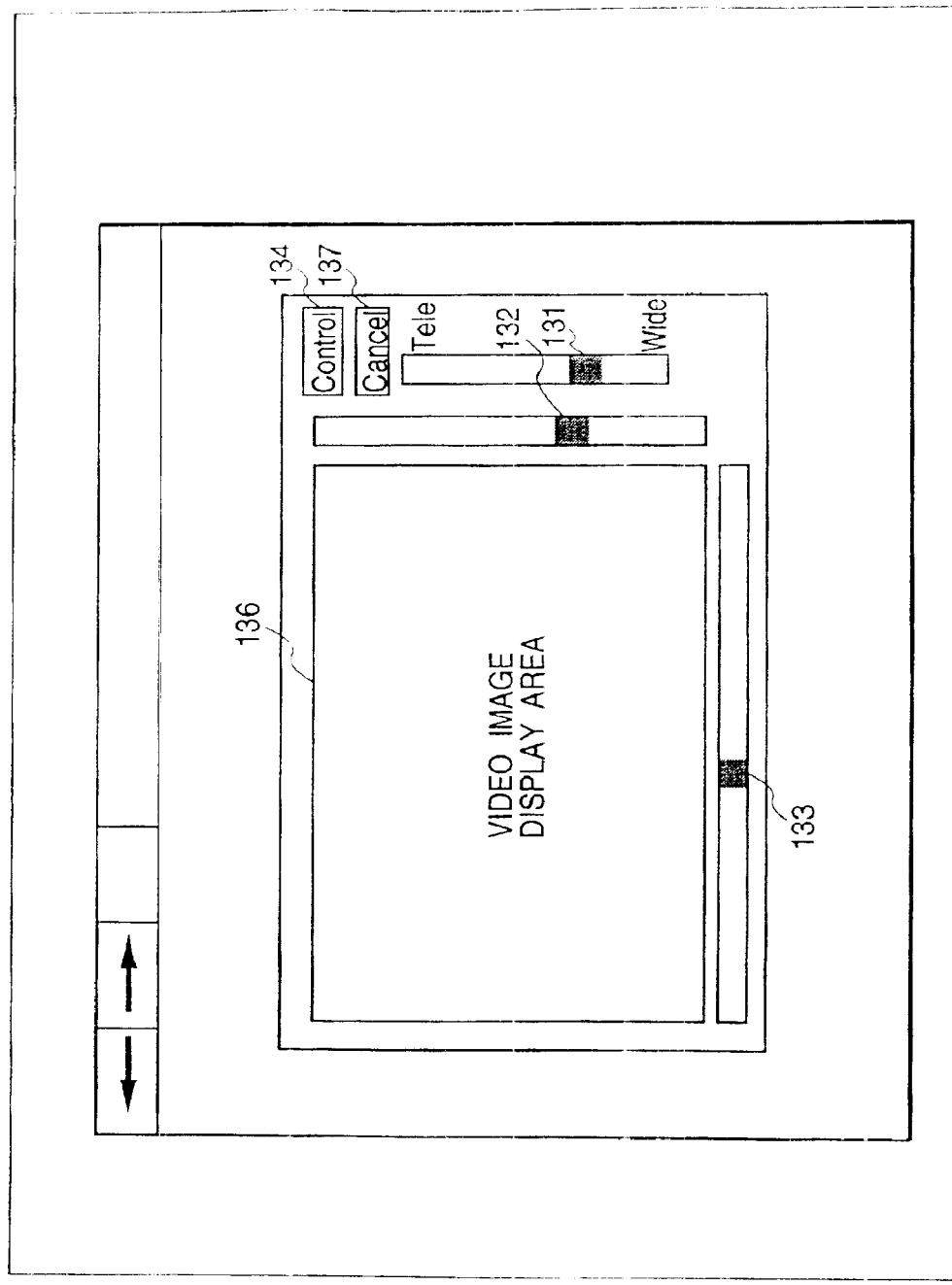
FIG. 14 is a view showing a display window of the display device 212 of the first and third embodiments.

For example, as compared with the mode shown in FIG. 5, when the camera device 103 does not have the back light correction function, a window having no back light correction button 135 is displayed by the module corresponding to this camera device 103, as shown in FIG. 14.

Figure 15:
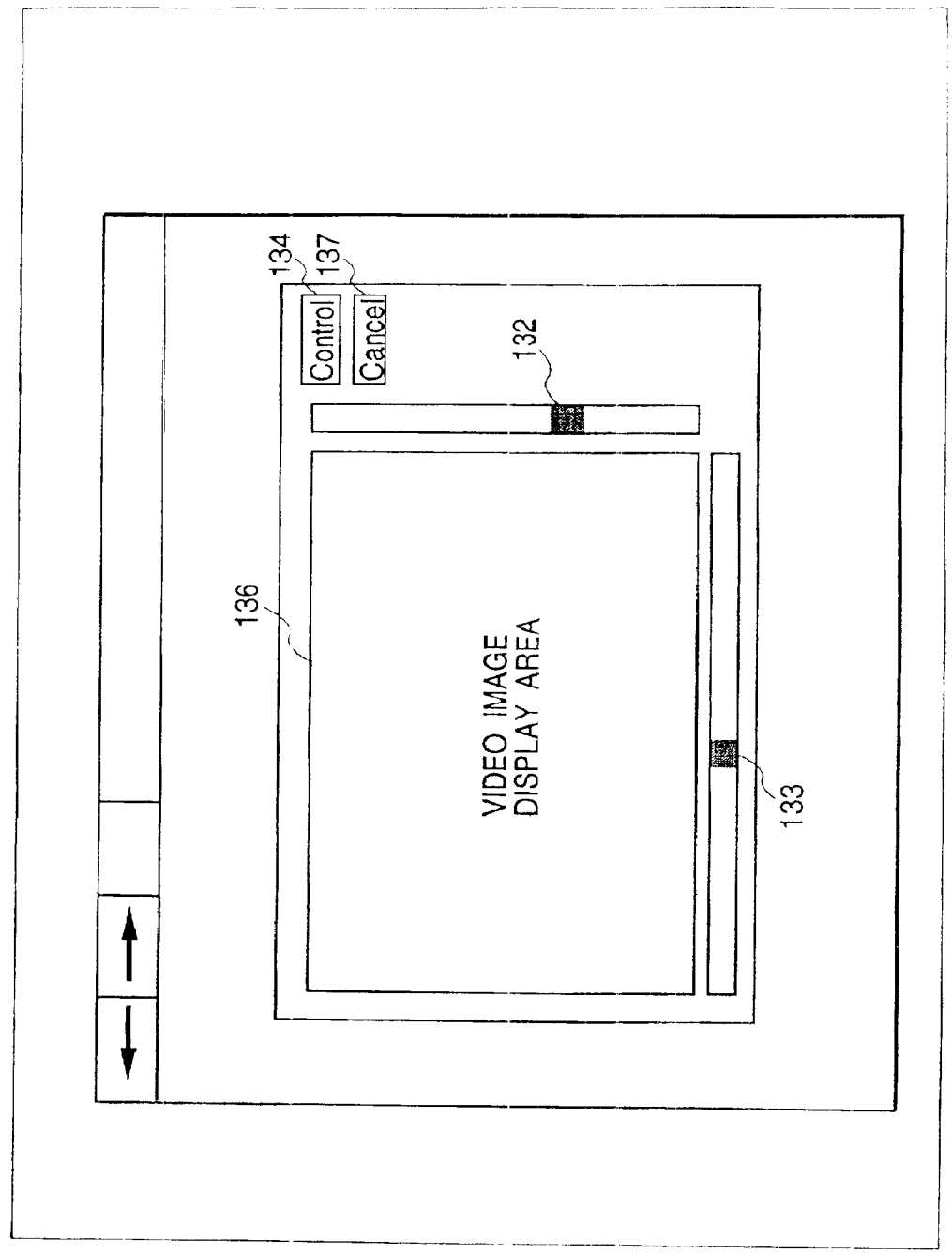
FIG. 15 is a view showing another display window of the display device 212 of the first and third embodiments.

For example, when the camera device 103 has neither the zoom function nor the back light correction function, a window having neither display elements associated with the zoom function nor the back light correction button 135 is displayed by the module corresponding to this module 103, as shown in FIG. 15.

Figure 16:
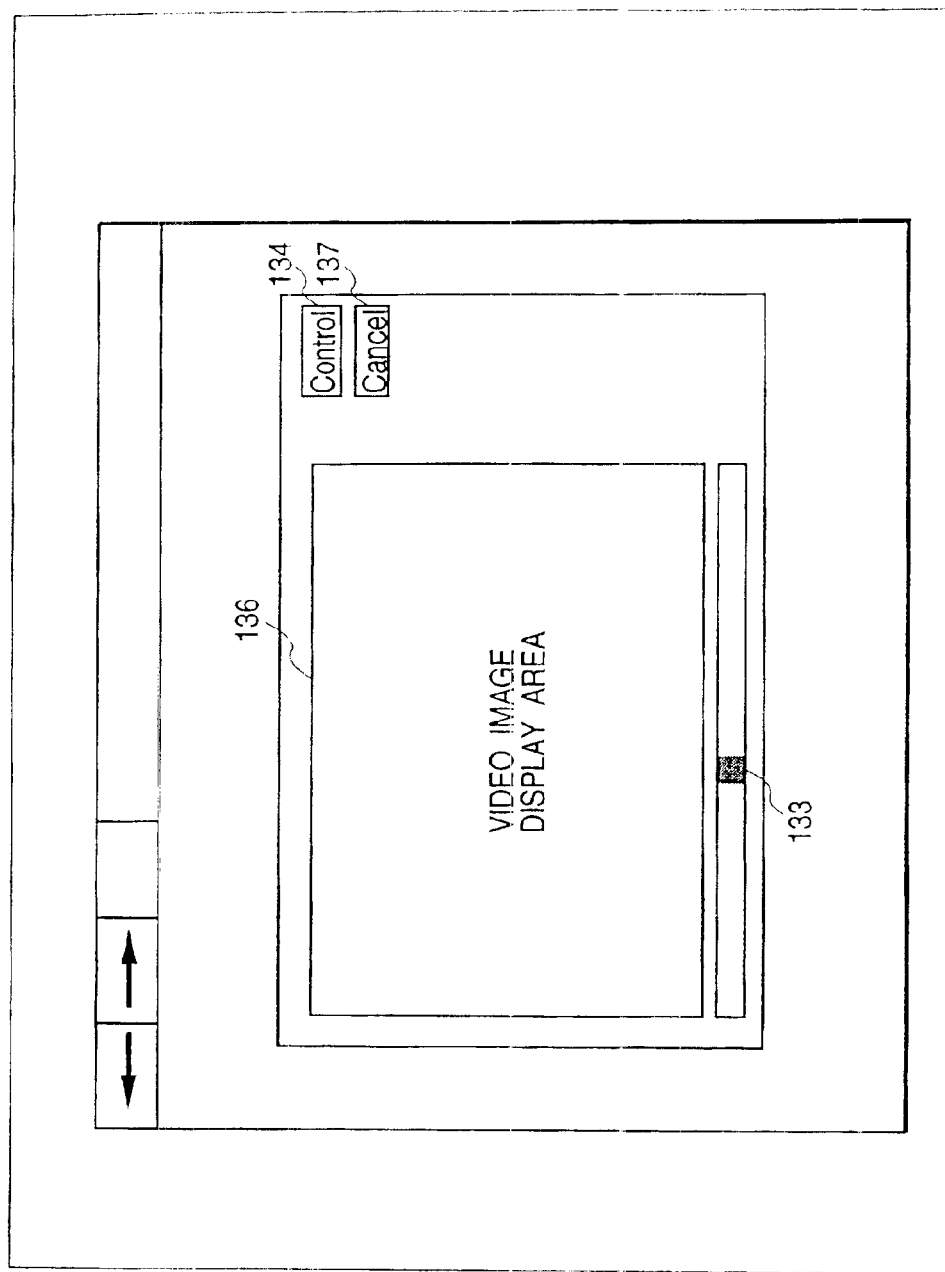
FIG. 16 is a view showing still another display window of the display device 212 of the first and third embodiments.

For example, when the camera device 103 does not have the tilt function, zoom function, and back light correction function, a window having no bars 132 and 131, display elements associated with the zoom function, and the back light correction button 135 is displayed by the module corresponding to this camera device 103, as shown in FIG. 16.

Since the window contents change depending on the selected modules in accordance with the camera functions as described above, the user can perform appropriate operations.

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the above storage medium, the program codes corresponding to the flow charts described above are stored in the storage medium. For the sake of descriptive convenience, the modules indispensable to the camera control system of the present invention are stored in the storage medium.

As has been described above, according to the present invention, there can be provided a camera control system which can flexibly control all kinds of cameras.

Many widely different embodiments of the present invention may be constructed without departing from the spirit and scope of the present invention. It should be understood that the present invention is not limited to the specific embodiments described in the specfication, except as defined in the appended claims.

What is claimed is:

1. A camera operation apparatus for operating a camera via a network, comprising:
   a storage device for storing at least one module for generating a control command for the camera in accordance with each kind of camera;
   a recognition device for recognizing information associated with a kind of camera subject to control;
   a selection device for selecting a module for generating the control command for the camera from said at least one module, on the basis of the information associated with the kind of camera recognized by said recognition device; and
   a module request device, connected to the network, for requesting through the network, transmission of the module corresponding to the kind of camera recognized by said recognition device to a device having the module corresponding to the kind of camera recognized by said recognition device, when said camera operation apparatus has no module corresponding to the kind of camera recognized by said recognition device.

2. An apparatus according to claim 1, further comprising:
   a control right request device to requesting a control right for the camera to a camera server executing control of the camera,
   wherein the information associated with the kind of camera is attached to a control right obtaining notice for the camera notified from the camera server in response to a request to the control right for the camera by said control right request device.

3. An apparatus according to claim 1, further comprising:
   a display device for displaying a window for operating the camera, on the basis of the module selected by said selection device,
   wherein said display device changes at least display contents for operation in said window in accordance with a kind of camera.

4. An apparatus according to claim 1, wherein said camera operation apparatus allows at least one of panning and tilting operations of the camera.

5. A camera operation apparatus for operating a camera via a network, comprising:
   a storage device for storing at least one module for generating a control command for the camera in accordance with each kind of camera;
   a recognition device for recognizing information associated with a kind of camera subject to control;
   a selection device for automatically selecting a module for generating the control command for the camera from said at least one module, on the basis of the information associated with the kind of camera recognized by said recognition device; and
   a display device for displaying a window for operating the camera, on the basis of the module selected by said selection device,
   wherein said display device changes at least display contents for operation in said window in accordance with a kind of functions the camera can perform.

6. An apparatus according to claim 5, wherein said camera operation apparatus allows at least one of panning and tilting operations of the camera.

7. A camera operation method of operating a camera via a network, comprising the steps of:
   storing at least one module for generating a control command and for the camera in accordance with each kind of camera;
   recognizing information associated with a kind of camera subject to control;
   selecting a module for generating the control command for the camera from said at least one module, on the basis of the information associated with the kind of camera recognized in the recognizing step; and
   requesting through the network, transmission of the module corresponding to the kind of camera recognized in the recognizing step to a device having the module corresponding to the kind of camera recognized in the recognizing step, when there is no module corresponding to the kind of camera recognized in the recognizing step.

8. A method according to claim 7, further comprising the step of:
   requesting a control right for the camera to a camera server executing control of the camera,
   wherein the information associated with the kind of camera is attached to a control right obtaining notice for the camera notified from the camera server in response to a request to the control right for the camera in the requesting step.

9. A method according to claim 7, further comprising the step of:

displaying a window for operating the camera, on the basis of the module selected in the selecting step, wherein said displaying step changes at least display contents for operation in said window in accordance with a kind of camera.

10. A method according to claim 7, wherein said camera operation method allows at least one of panning and tilting operations of the camera.

11. A camera operation method of operating a camera via a network, comprising the steps of:

storing at least one module for generating a control command for the camera in accordance with each kind of camera;

recognizing information associated with a kind of camera subject to a control;

selecting automatically a module for generating the control command for the camera from said at least one module, on the basis of the information associated with the kind of camera recognized in the recognizing step; and displaying a window for operating the camera, on the basis of the module selected in the selecting step, wherein said displaying step changes at least display contents for operation said window in accordance with a kind of functions the camera can perform.

12. A method according to claim 11, wherein said camera operation method allows at least one of panning and tilting operations of the camera.

13. A storage medium for storing a computer-readable program for executing a camera operation processing comprising the steps of:

storing at least ane module for generating a control command for a camera in accordance with each kind of camera;

recognizing information associated with a kind of camera subject to control;

selecting a module for generating the control command for the camera from said at least one module, on the basis of the information associated with the kind of camera recognized in the recognizing step; and requesting through a network, transmission of the module corresponding to the kind of camera recognized in the recognizing step to a device having the module corresponding to the kind of camera recognized in the recognizing step when there is no module corresponding to the kind of camera recognized in the recognizing step.

14. A medium according to claim 13, wherein the processing further comprises the step of:

requesting a control right for the camera to a camera sever executing control of the camera, wherein the information associated with the kind of camera is attached to a control right obtaining notice for the camera notified from the camera server in response to a request to the control right for the camera in the requesting step.

15. A medium according to claim 13, wherein the processing further comprises the step of:

displaying a window for operating the camera, on the basis of the module selected in the selecting step, wherein said display step includes changing display contents for operation on at least the window in accordance with a kind of camera.

16. A: medium according to claim 13, wherein the processing allows at least one of panning and tilting operations of the camera.

17. A storage medium for storing a computer-readable program for executing a camera operation processing comprising the steps of:

storing at least one module for generating a control command for a camera in accordance with each kind of camera;

recognizing information associated with a kind of camera subject to control;

selecting automatically a module for generating the control command for the camera from said at least one module, on the basis of the information associated with the kind of camera recognized in the recognizing step; and displaying a window for operating the camera, on the basis of the module selected in the selecting step;

wherein said displaying step changes at least display contents for operation in said window in accordance with a kind of functions the camera can perform.

18. A medium according to claim 17, wherein the processing allows at least one of panning and tilting operations of the camera.

19. A camera server for controlling a camera on the basis of a control instruction received from a camera operation apparatus via a network, comprising:

a storage device for storing at least one module for controlling the camera in accordance with each kind of camera;

a selection device for selecting a module for controlling the camera from said at least one module; and a module request device for requesting through the network, transmission of the module corresponding to the kind of current camera connected with said camera server, when no module corresponding to the kind of current connected camera is stored by said storage device.

20. A camera server according to claim 19, wherein the control instruction is at least one of panning, tilting and zooming operations of the camera.

21. A camera server according to claim 19, wherein when the transmission of the module is achieved, the restart-up of said camera server is performed.

22. A method of controlling a camera server for controlling a camera on the basis of a control instruction received from a camera operation apparatus via a network, comprising the steps of:

storing at least one module for controlling the camera in accordance with each kind of camera;

selecting a module for controlling the camera from said at least one module; and requesting through the network, transmission of the module corresponding to the kind of current camera connected with said camera server, when no module corresponding to the kind of current connected camera is stored in said storing step.

23. A method according to claim 22, wherein the control instruction is at least one of panning, tilting and zooming operations of the camera.

24. A method according to claim 22, wherein when the transmission of the module is achieved, the restart-up of said camera server is performed.

25. A storage medium for storing a computer-readable program for executing a method of controlling a camera server for controlling a camera on the basis of a control instruction received from a camera operation apparatus via a network, said method comprising the steps of:

storing at least one module for controlling the camera in accordance with each kind of camera;

selecting a module for controlling the camera from said at least one module; and requesting through the network, transmission of the module corresponding to the kind of current camera connected with said camera server, when no module corresponding to the kind of current connected camera is stored in said storing step.

26. A storage medium according to claim 25, wherein the control instruction is at least one of panning, tilting and zooming operations of the camera.

27. A storage medium according to claim 25, wherein when the transmission of the module is achieved, the restart-up of said camera server is performed.

* * * * *